(12) United States Patent
Palm

(10) Patent No.: US 8,467,364 B2
(45) Date of Patent: *Jun. 18, 2013

(54) SYSTEM FOR TRANSMITTING HIGH THROUGHPUT DATA BETWEEN MULTIPLE DEVICES

(75) Inventor: Stephen R. Palm, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,555

(22) Filed: Jul. 31, 2012

(65) Prior Publication Data

US 2012/0294241 A1 Nov. 22, 2012

Related U.S. Application Data

(63) Continuation of application No. 13/216,504, filed on Aug. 24, 2011, now Pat. No. 8,243,705, which is a continuation of application No. 11/397,660, filed on Apr. 3, 2006, now Pat. No. 8,009,642.

(60) Provisional application No. 60/736,677, filed on Nov. 14, 2005.

(51) Int. Cl.
*H04W 4/00* (2009.01)

(52) U.S. Cl.
USPC ........... 370/338; 370/345; 370/346; 370/449; 370/328; 370/350; 370/206; 370/254; 370/395.3

(58) Field of Classification Search
USPC ................. 370/345, 346, 449, 328, 338, 350, 370/395.3, 254, 206
See application file for complete search history.

(56) References Cited

U.S. PATENT DOCUMENTS

2005/0135284 A1* 6/2005 Nanda et al. ................... 370/294
2006/0262734 A1* 11/2006 Appanna et al. .............. 370/254

* cited by examiner

*Primary Examiner* — Kamran Afshar
*Assistant Examiner* — Khalid Shaheed
(74) *Attorney, Agent, or Firm* — Garlick & Markison

(57) ABSTRACT

A system for transmitting data directly between a plurality of client network devices in a network having an Access Point ("AP") device separate from the plurality of client network devices is disclosed. The system may include a first client network device having a first client ("STA") module and a second client network device of the plurality of client network devices.

20 Claims, 4 Drawing Sheets

SYSTEM FOR TRANSMITTING HIGH THROUGHPUT DATA BETWEEN MULTIPLE DEVICES

CROSS REFERENCE To RELATED APPLICATIONS

The present U.S. utility patent application claims priority under 35 U.S.C. §120, as a continuation of U.S. utility patent application having an application Ser. No. 13/216,504, filed Aug. 24, 2011, now U.S. Pat. No. 8,243,705, which is incorporated herein by reference in its entirety for all purposes. The Ser. No. 13/216,504 application claims priority under 35 U.S.C. §120, as a continuation of U.S. utility patent application having an application Ser. No. 11/397,660, filed Apr. 3, 2006, now U.S. Pat. No. 8,009,642, which is also incorporated herein by reference in its entirety for all purposes. The Ser. No. 11/397,660 application claims priority under 35 U.S.C. §119(e) to U.S. provisional application 60/736,677, filed Nov. 14, 2005.

BACKGROUND OF THE INVENTION

1. Field of the Invention

The invention relates to management of communication networks, and in particular to a system for connecting multiple devices and transmitting high throughput data between the devices.

2. Related Art

Telecommunication systems continue to evolve and expand their presence in modern society. As an example, wireless networking has grown in popularity as a result of the improvements in portable computers (i.e., laptop computers), wireless technology, broadband access to the Internet, network gaming, and a growing popularity to network computer systems together into local area networks ("LANs") for both business and consumer applications. The most popular types of wireless networks for connecting multiple computers are at present configured utilizing the Institute of Electrical and Electronics Engineers ("IEEE") 802.11 standard, which are generally known as a "802.11 networks," "Wireless Fidelity networks," "Wi-Fi networks," or "WiFi networks."

Generally, an 802.11 network includes at least two communication devices in signal communication with each other via a wireless signal path. An Access Point ("AP") acts as a communication hub for the plurality of wireless communication devices to connect into a wireless LAN ("WLAN") or into a wired LAN if the communication device is in signal communication with the wired LAN. The wireless communication devices are generally known as "802.11 clients," "clients," "client devices," "stations" ("STAs"), "802.11 stations," and/or "802.11 STAs." Additionally, when STAs are in signal communication with an AP, it is referred to as infrastructure mode.

With the maturing of the different amendments of the baseline standard (such as, for example, IEEE 802.11a, 802.11b, and 802.11g) for 802.11 networks, there is an increasing interest in home networking to enable users to enjoy the ubiquitous availability of digital content that a home network provides. In these networks, many forms of data may be exchanged between the network devices including, for example, voice, financial and business information, digital content, audio and/or visual ("AV") material, and email, to name a few. Much of this information, such AV material, generally requires that large amounts of data be transmitted across the network and home networks typically operate in infrastructure mode.

Unfortunately, if two IEEE 802.11 clients attempt to exchange data between one another in infrastructure mode, data is exchanged through the AP where the data is first sent from the first client to the AP and then the AP retransmits the data to the second client. This may cause data between clients to take twice as long or utilize twice as much throughput.

As an example in FIG. 1, a block diagram of an example of an implementation of a known network architecture 100 for data transfer between client devices utilizing the 802.11 standard is shown. As mentioned above, in infrastructure networks, the 802.11 standard requires that data transfer occur between an AP and a client device. As an example, the known network architecture 100 may include Device A 102, Device B 104, and Device C 106. In this example, Device C 106 is in signal communication with both Device A 102 and Device B 104 via signal paths 108 and 110, respectively. Additionally, Device C 106 may function as an AP, and Device A 102 and Device B 104 may function as STAs where Device A 102 functions as a media server and Device B 104 functions as a media render. Generally, a media server is device, or software module, that processes multimedia applications such as, for example, AV streaming, still image storage, and music streaming programs. A media render is a device, or software module, that is capable of receiving and processing data from the media server.

In an example of operation, if Device A 102 is to transmit data to Device B 104, the data is first transmitted from Device A 102 to Device C 106, via signal path 108, and then retransmitted from Device C 106 to Device B 104 via signal path 110. While this arrangement is functional it is not efficient since it takes approximately twice as long to transmit data from Device A 102 to Device B 104 through Device C 106 than it would to directly transmit the data from Device A 102 to Device B 104. Unfortunately, this generally reduces the total throughput in a shared medium transmission system such as a 802.11 network by approximately half.

Attempted solutions to this problem include an IEEE 802.11e amendment that includes a Direct Link Setup ("DLS") functionality that allows data transfer to be setup directly between clients. In FIG. 2, a block diagram of an example of an implementation of the traditional network architecture 200 utilizing the proposed IEEE 802.11e DLS functionality for data transfer between clients is shown. As an example, the known network architecture 200 may include Device A 202, Device B 204, and Device C 206. In this example, Device C 206 is in signal communication with both Device A 202 and Device B 204 via signal paths 208 and 210, respectively. Additionally, Device A 202 and Device B 204 may be in signal communication via signal path 212. Similar to FIG. 1, in this example, Device C 206 may function as an AP, and Device A 202 and Device B 204 may function as STAs where Device A 202 functions as a media server and Device B 204 functions as a media render.

In an example of operation, if Device A 202 is to transmit to Device B 204 utilizing IEEE 802.11e DLS (or similar proposals), Device A 202 negotiates with Device C 206 in order to setup a connection with Device B 204. Device C 206 then negotiates a connection with Device B 204 and after negotiation, Device A 202 transmits data directly to Device B 204 without passing through Device C 206. Therefore, in this example, Device C 206, acting as an AP, must be utilized by both Device A 202 and Device B 204 to communicate to each other even if the communication is going to be only between Device A 202 and Device 204.

While under certain circumstances data transmission may be more efficient than the process described in FIG. 1, it unfortunately requires that all three communicating devices on the network implement the new DLS functionality. This is unlikely in a typical scenario because there are approximately about 100 million 802.11 devices that have already been deployed in the field without DLS functionality. Therefore, there is a need for a system and method to transmit data between client devices with high overall throughput and low latency that is backward compatible with existing network devices.

SUMMARY OF THE INVENTION

The present invention is directed to apparatus and methods of operation that are further described in the following Brief Description of the Drawings, the Detailed Description of the Invention, and the Claims. Other features and advantages of the present invention will become apparent from the following detailed description of the invention made with reference to the accompanying drawings.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
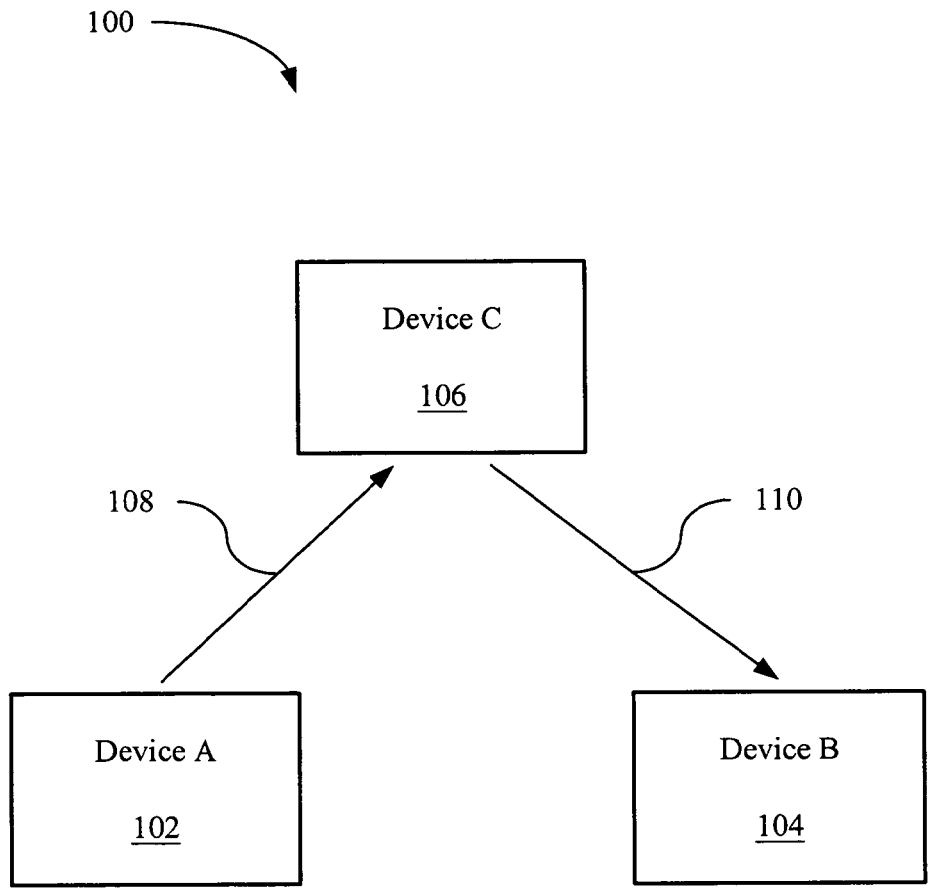
FIG. 1 shows a block diagram of an example of an implementation of a known network architecture for data transfer between IEEE 802.11 clients.
Figure 2:
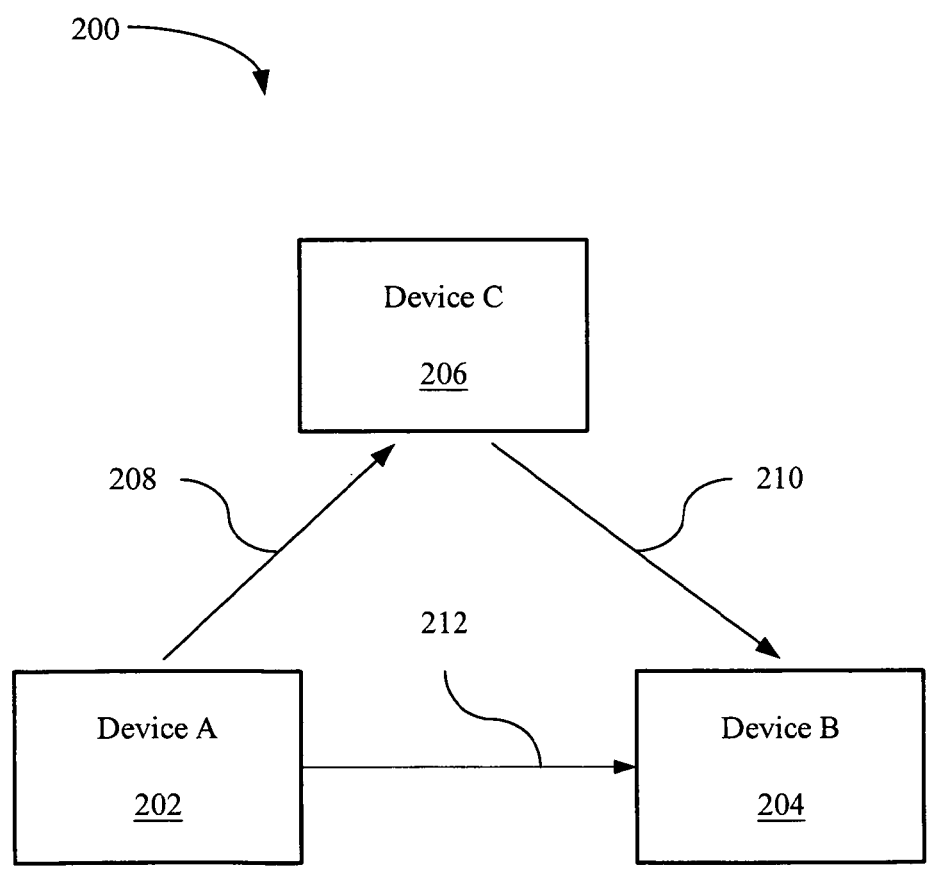
FIG. 2 shows a block diagram of an example of an implementation of a known network architecture utilizing an IEEE 802.11e Direct Link Setup ("DLS") functionality for data transfer between clients.

In the following description of the preferred embodiment, reference is made to the accompanying drawings that form a part hereof, and which show, by way of illustration, a specific embodiment in which the invention may be practiced. Other embodiments may be utilized and structural changes may be made without departing from the scope of the present invention.

Additionally, although the following description makes reference to particular communication network technologies and network entities as examples, it is appreciated to those skilled in the art that the description is not limited to these examples and other network technologies examples supporting a different arrangement of network entities also may be employed without departing from the spirit and scope of the invention. In addition, the description makes reference to terms such as "devices," "modules," and "functions". It is appreciated that a device and/or module performing a given function "x" as part of its operation also may be referred to as an "x" device, "x" module, or as an "x" function, interchangeably, without departing from the spirit or scope of the invention.

A system for transmitting data directly between a plurality of client network devices in a network having an Access Point ("AP") device separate from the plurality of client network devices is disclosed. The system may include a first client network device and a second client network device of the plurality of client network devices. The first client network device may include a first client ("STA") module and a second STA module. The first STA module may be configured to selectively communicate with the AP device. The second client network device may include a client AP module and a third STA module. The third STA module may be configured to selectively communicate with the AP device. The second STA module may be configured to selectively communicate with the client AP module.

Additionally disclosed is a Dual Access Point and Station ("DAS") enabled device for transmitting data directly between the DAS enabled device and a plurality of client network devices in a network having an Access Point ("AP") device separate from the plurality of client network devices. The DAS enabled device may include a client ("STA") module and a client AP module. The STA module may be configured to selectively communicate with the AP device or communicate directly with a first client network device from the plurality of client network devices. The client AP module may be configured to selectively communicate directly with the first client network device or another client network device from the plurality of client network devices.

In an example of operation, the invention performs a process for transmitting data directly between a plurality of client network devices in a network having an access point device separate from the plurality of client network devices. The process includes receiving a broadcast message at a first client network device in the plurality of client network devices, wherein the broadcast message includes information indicating network capabilities of a second client network device in the plurality of client network devices. The process also includes determining the network capabilities of the second client network device in response to receiving the broadcast message, exchanging packet information with the second client network device based on the network capabilities of the second client network device, and establishing a direct communication path with the second client network device, wherein the direct communication path is a signal path that does not include the access point device.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

Figure 3:
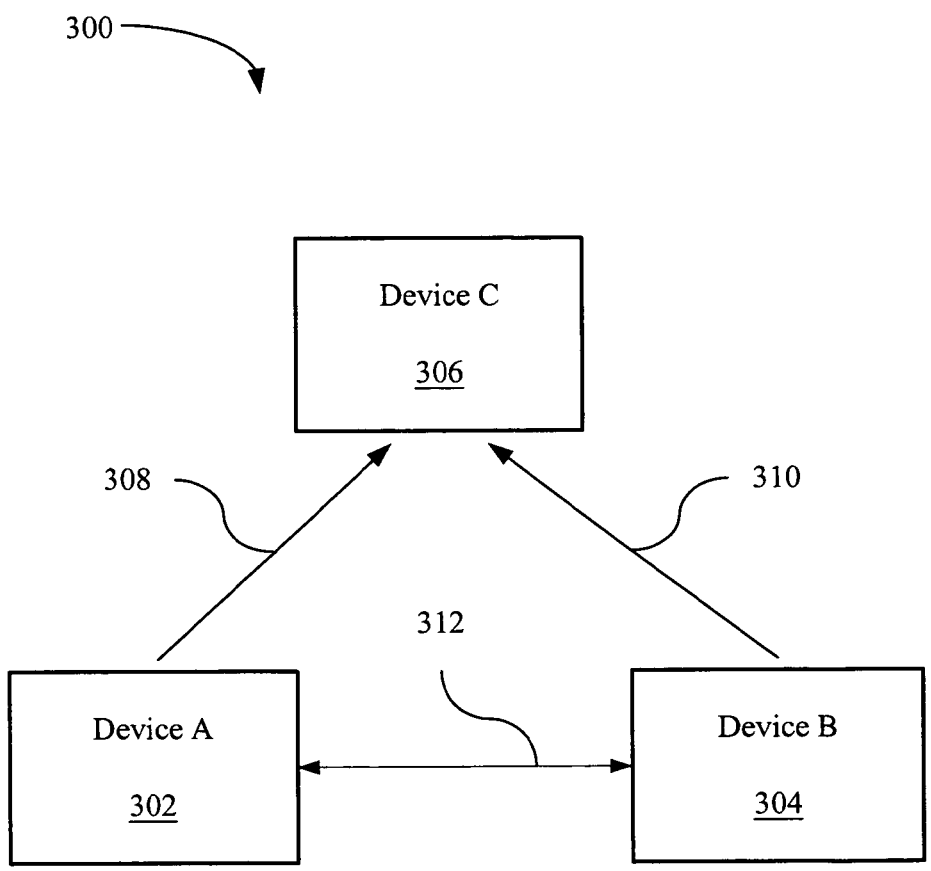
FIG. 3 shows a block diagram of an example of an implementation of a network architecture of a system for transmitting high throughput data between multiple devices ("STDMD") in accordance with the invention.

In FIG. 3, a block diagram of an example of an implementation of a network architecture of a system for transmitting high throughput data between multiple devices ("STDMD") 300 in accordance with the invention is shown. The STDMD may include Device A 302, Device B 304, and Device C 306. In this example, Device C 306 is in signal communication with both Device A 302 and Device B 304 via signal paths 308 and 310, respectively. Additionally, Device A 302 and Device B 304 may be in signal communication via signal path 312.

In this example, one or more network devices (such as, for example, Device A 302, Device B 304, and Device C 306) within the network architecture of the STDMD 300 may be connected to one or more other network devices. Additionally, one or more of these network devices may implement a Dual Access Point and Station ("DAS") functionality that allows connection to traditional Access Points ("APs"), traditional client devices (i.e., stations "STAs"), or other DAS devices. In general, a DAS device implements a new functionality, in addition to functionality traditionally associated with one or more APs and/or traditionally associated with one or more STAs. Generally, the DAS new functionality has both AP and STA functionality and a DAS enabled device may be associated to multiple networks. Each packet of data to or from the DAS enabled device is for at least one of the networks and selecting a network for transmission may be based on addresses such as, for example, media access control ("MAC") and/or Internet protocol ("IP") address. Additionally, a DAS enabled device may receive any packet of data from any network that it is a member of. The DAS device may have DAS function as a result of having one or more AP modules and one or more STA modules within the DAS device.

Therefore, in this example, Device C 306 may function as an AP, and Device A 302 and Device B 304 may function as STAs to Device C 306. However, if Device A 302 is a DAS device, then Device A 302 may function as a media server and a client AP to device B 304 and an STA to device C 306. Similarly, if Device B 304 is a DAS device, then Device B 304 that may function as a media render and an STA to Device A 302 and an STA to Device C 306. In this example, both Device A 302 and Device B 304 may utilize an association configuration protocol ("ACP") that allows devices to easily determine the AP, client AP, and STA functionality relationships to each other. As an example, Device A 302 and Device B 304 also may be client devices such as 802.11 client devices and Device C 306 also may be an 802.11 AP type device such as 802.11 AP device.

In an example of operation, Device A 302 is to transmit data directly to Device B 304 and still have the ability to transfer some data to and from Device C 306, Device B 304 is also to receive data directly from Device A 302 and still have the ability to transfer some data to and from Device C 306, and Device C 306 implements the functionality traditionally associated with an AP. However in this example, Device C 306 may be unaware of the request and protocol related with Device A 302 transmitting directly to Device B 304.

As mentioned above, a DAS enabled device may implement one or more of the following functionalities, in addition to functionality traditionally associated with one or more APs, functionality traditionally associated with one or more STAs, and functionality associated with an ACP.

Association Control Protocol ("ACP")

A DAS enabled device may implement an ACP Configurator functionality and/or ACP Client functionality. An ACP Configurator may be adapted to broadcast an ACP type-length-value ("TLV") indicating an open ACP Window. The ACP TLV may broadcast utilizing layer-2 broadcast and/or layer-3 broadcast messaging.

Besides the exchange of information related to security, other types of information may also be exchanged within the network architecture of the STDMD 300 of FIG. 3. For example, client configuration information may be exchanged by the STDMD 300. Additionally, Quality of Service ("QoS") parameters, such as Network User Priorities, may be assigned by the ACP Configurator, based on traffic information provided by an ACP Client. Moreover, an ACP Configurator and ACP Client may exchange device and service capabilities information.

ACP-Configurator: Layer-2

If the ACP utilizes layer-2 broadcast messaging, when the ACP process is initiated on a DAS enabled device, the ACP-configurator may add an ACP TLV field (such as, for example, type, length, value) to an Information Element ("IE") in its beacons to the network. An example of an IE structure is shown below:

```
struct acp_ie {
    uchar id;
    uchar len;
    uchar oui[3];
    uchar ver;
    uchar assoc;
    uchar flags;
    uchar acp_tlv[0]; /* Optional TLVs */
} PACKED;
```

The ACP data field of the TLV may have the following format:

| Bit Position | Description | Value |
|---|---|---|
| 0-5 | ACP Version | 1 to 63 |
| 6 | ACP-window open | 1 if ACP window is currently open, 0 otherwise |
| 7 | AP Recently Configured | 1 if AP was configured during the current ACP session, 0 otherwise |
| 8-15 | Length | Length in bytes of the ACP TLV |
| 16 | STA capable | 1 if device may operate as a STA |
| 17 | Multi-STA capable | 1 if device may operate as a STA in multiple SSIDs |
| 18 | AP capable | 1 if device may operate as a AP |
| 19 | Multi-AP capable | 1 if device may operate as a AP in multiple SSIDs |
| 20 | UPnP AV Server capable | 1 if device may operate as a UPnP AV server |
| 21 | UPnP AV Client capable | 1 if device may operate as a UPnP AV client |
| 22 | DLNA Media Server capable | 1 if device may operate as a DLNA Media server |
| 23 | DLNA Media Client capable | 1 if device may operate as a DLNA Media client |
| ... | ... | ... |

ACP-Configurator: Layer-3

If the ACP utilizes layer-3 broadcast messaging, a layer-3 ACP broadcast may be performed using a General Event Notification Architecture ("GENA") NOTIFY method such as, for example, the GENA Notify method described in the document by J. Cohen, S. Aggarwal, Y. Y. Goland, entitled "General Event Notification Architecture Base: Client to Arbiter", which is herein incorporated by reference in its entirety. As a result, the broadcast messaging may be performed utilizing a NTS value ACP Window ("ACP:Window") to multicast channel/port or the broadcast address. The value of NT in an ACP:Window request may be set to the service's service type, and the ACP:Window request may also include a USN header that is set to the ACP Configurator service's USN. It is appreciated that the NTS values, ACP Windows, NT values in an ACP:Window, and USN are fields that are defined by a GENA Notify method.

The ACP:Window requests may contain a Location and/or AL header. If there is no domain name server ("DNS") support available on the local area network ("LAN"), then a location may be provided utilizing an IP address of the ACP Configurator service. In addition, an ACP:Window notification may include a max-age header. Again, it is appreciated that the max-age header, Location header and AL header are also fields that are defined by a GENA Notify method.

In general, a response to a ACP:Window notification message may not be required.

An example of an ACP:Window notification message is shown, below, in Listing 1.

---
Listing 1
---
NOTIFY * HTTP/1.1
Host: 239.255.255.250:1900
NT: ID:ACP
NTS: ACP:Window:1:1:0
USN: someuniqueid::ID: ACP
AL/Location: http://192.168.1.1:80/index.xml
Cache-Control: max-age = 60

---

The ACP:Window data field may include, for example, three numeric values separated by colons, and may have the following format: ACP:Window:ACP Version:ACP WindowOpen:APRecentlyConfigured: (other values) where the values are show in the Listing 1 above.

As an example of operation, when an ACP Configurator sends an ACP Window notification message, the ACP Configurator may indicate this event to all STAs on the network, by broadcasting this information in a beacon IE or via the GENA Notify method, as described above. When an ACP Client device receives an ACP Window open indication message and the ACP Client device is in an ACP Activate mode, the ACP Client device may initiate messaging to the ACP Configurator by transmitting an initialization message to the ACP Configurator. This may be performed through an ACP Relay function, or possibly to the ACP Relay function, depending on the network technologies on either side of the ACP Relay function. It is appreciated by those skilled in the art that some network technologies do not involve formal association before transmission of data packets in order to proceed to an authentication or configuration phase. If a formal association is involved, the ACP Relay function and the ACP Client device may associate in order to complete the rest of the ACP messaging such as, for example, during authentication or configuration.

The initiation of the ACP window may be entered into via, for example, an external input such as, for example, the local pushing of a button on a gateway by a user, remote configuration, or out of band transfer of data such as, for example, a hardware device like a universal serial bus ("USB") drive, flash memory, etc.

The ACP approach may be implemented utilizing an Extensible Authentication Protocol ("EAP") such as described in the document by L. Blunk and J. Vollbrecht, entitled "PPP Extensible Authentication Protocol (EAP)", published as Internet Engineering task Force (IETF) RFC 2284, March 1998 or IEEE 802.1X, which is herein incorporated by reference in its entirety. Example components for an EAP include 1) an Authentication Server, 2) an Authenticator, and 3) a Peer or Supplicant. The ACP Configurator function may act, for example within an 802.11 network, as the Authentication Server and Authenticator for an Extensible Authentication Protocol (EAP), and the ACP Client function may act as the Supplicant. a In another example of an implementation of the invention, the ACP approach may utilize a discovery or configuration protocol such as:
1) Secure Easy Setup;
2) OASIS Simple Config;
3) 7C Simple Config;
4) Microsoft Link Layer Topology Discovery (LLTD);
5) Universal Plug and Play (UPnP); or
6) Digital Living Network Alliance (DLNA).

In another example of an implementation of the invention, this ACP approach may be applied to wired network devices. In wired LANs, Slave devices that communicate through a Master device may instead communicate directly to other Slave devices.

In general, the invention performs a process for transmitting data directly between a plurality of client network devices in a network having an access point device separate from the plurality of client network devices. The process includes receiving a broadcast message at a first client network device in the plurality of client network devices, wherein the broadcast message includes information indicating network capabilities of a second client network device in the plurality of client network devices. The process also includes determining the network capabilities of the second client network device in response to receiving the broadcast message, exchanging packet information with the second client network device based on the network capabilities of the second client network device, and establishing a direct communication path with the second client network device, wherein the direct communication path is a signal path that does not include the access point device.

Figure 4:
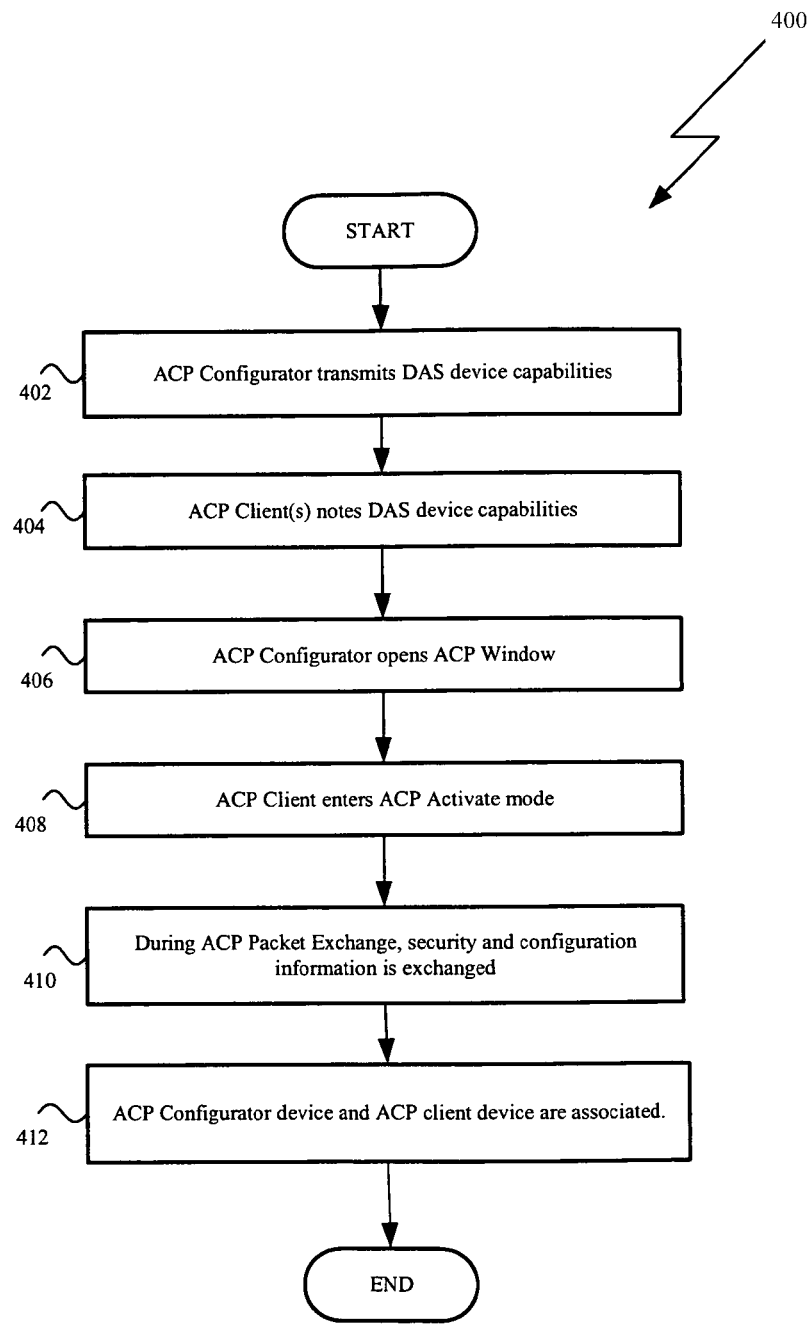
FIG. 4 is a flow diagram illustrating an example of implementation of a process for connecting multiple wireless devices, in accordance with the invention.

Turning to FIG. 4, a flow diagram 400 illustrating an example of process for association of devices (including one or more DAS devices) is shown in accordance with the invention. The process starts in step 402, an ACP Configurator in a network device broadcasts a message signal that indicates the capabilities of a network device. In step 404, one or more ACP Clients (in one or more other network devices) determine the contents of the ACP capabilities message in the message signal and, in step 406, the ACP Configurator enters the ACP Window state either by remote or local interaction (i.e., such as, for example, the pushing of a button). Similarly, in step 408, an ACP Client enters the ACP Active state either by remote or local interaction (i.e., again such as, for example, the pushing of a button). In step 410, security and configuration information is exchanged between the ACP Configurator and ACP Client during an ACP Packet Exchange. During the ACP Packet Exchange, a "handshake" procedure may take place between the two devices after the second device has determined the capabilities of the first device from the broadcast message signal. In step 412, the ACP Configurator device and ACP client device are successfully associated and their roles as a STA or AP for this association have been established and the process ends. Additional optional steps may also include communicating initially with a third device that includes a traditional AP device.

The network capabilities may include the capability of utilizing an ACP and determining the network capabilities of the second client network device may include determining an ACP TLV from the broadcast message. The process may further include entering into an ACP Active state in response to determining the network capabilities of the second client network device. Exchanging packet information may include transmitting an initialization message to an ACP Configurator within the second client network device, wherein the transmitting an initialization message may include utilizing an ACP Relay function.

Additionally, the process also may include entering into an ACP Window state at the second device after transmitting the broadcast message, wherein entering into an ACP Window state may be responsive to an external input.

Persons skilled in the art will understand and appreciate, that one or more processes, sub-processes, or process steps described may be performed by hardware or software, or both. Additionally, the invention may be implemented completely in software that would be executed within a microprocessor, general-purpose processor, combination of processors, DSP, or ASIC. The invention may be realized in a centralized fashion in at least one computer system, or in a distributed fashion where different elements are spread across several interconnected computer systems. If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium", "computer-readable medium" or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

While the present invention has been described with reference to certain embodiments, it will be understood by those skilled in the art that various changes can be made and equivalents can be substituted without departing from the scope of the present invention. It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A method to transmit data directly between a first device and a second device in a network via a first pathway, in which the first device and the second device also communicate with a network access point via a second pathway, the method comprising:
    enabling the first device, which is a Dual Access Point and Station ("DAS") device having functionality to operate both as a station and as an access point, to operate in an access point ("AP") mode by selecting the AP mode to communicate directly with the second device via the first pathway;
    configuring an Association Configuration Protocol ("ACP") configurator of the first device to configure an ACP broadcast message that includes information indicating device capabilities of the first device, wherein the ACP broadcast message includes an ACP type-length-value ("TLV") field to indicate an open ACP window;
    transmitting the ACP broadcast message to the second device in a broadcast beacon via the first pathway without utilizing the second pathway and the network access point;
    receiving a response from the second device when the second device is capable of responding to the AP mode of a DAS-enabled device to establish a client-server pair between the first and second devices and a direct communication link via the first pathway; and
    exchanging data wirelessly and directly between the first device and the second device using the first pathway during a period of the open ACP window.

2. The method of claim 1, wherein the TLV field is added to an Information Element ("IE") in the broadcast beacon.

3. The method of claim 1, wherein the ACP window is opened responsive to an external input.

4. The method of claim 1, wherein when establishing the direct communication link, the second device transmits an initialization message to the ACP configurator of the first device.

5. The method of claim 1, wherein the direct communication link of the first pathway utilizes IEEE 802.11a, IEEE 802.11b or IEEE 802.11g communication protocol.

6. A method to transmit data directly between a first device and a second device in a network via a first pathway, in which the first device and the second device also communicate with a network access point via a second pathway, the method comprising:
    enabling the first device, which is a Dual Access Point and Station ("DAS") device having functionality to operate both as a station and as an access point, to operate in an access point ("AP") mode by selecting the AP mode to communicate directly with the second device via the first pathway, in which the second device is operable to respond to a DAS capable device;
    configuring an Association Configuration Protocol ("ACP") configurator of the first device to configure an ACP broadcast message that includes information indicating device capabilities of the first device and that the first device is a DAS device, wherein the ACP broadcast message includes an ACP type-length-value ("TLV") field to indicate an open ACP window;
    transmitting the ACP broadcast message to the second device in a broadcast beacon via the first pathway without utilizing the second pathway and the network access point;
    receiving a response from the second device, when the second device identifies the first device as a DAS device operating in the AP mode, to establish a client-server pair between the first and second devices and a direct communication link via the first pathway;
    exchanging data wirelessly and directly between the first device and the second device using the first pathway during a period of the open ACP window; and
    switching from the AP mode to a station ("STA") mode for the first device after exchanging data between the first and second devices to have the first device communicate with the network access point for communication via the second pathway in the STA mode.

7. The method of claim 6, wherein the TLV field is added to an Information Element ("IE") in the broadcast beacon.

8. The method of claim 6, wherein when the ACP window is opened, security information is exchanged between the first and second devices.

9. The method of claim 6, wherein when establishing the direct communication link, the second device transmits an initialization message to the ACP configurator of the first device.

10. The method of claim 6, wherein the direct communication link of the first pathway utilizes IEEE 802.11a, IEEE 802.11b or IEEE 802.11g communication protocol.

11. The method of claim 10, wherein when in the STA mode, communication link with the network access point also utilizes one of the IEEE 802.11a IEEE 802.11b or IEEE 802.11g communication protocol.

12. The method of claim 6, wherein when in the STA mode, communication link with the network access point utilizes IEEE 802.11a, IEEE 802.11b or IEEE 802.11g communication protocol.

13. A Dual Access Point and Station ("DAS") enabled apparatus to wirelessly transmit data directly between the DAS enabled apparatus and a second device in a network via a first pathway, in which the DAS enabled apparatus and the second device also to communicate wirelessly with a network access point via a second pathway, the DAS enabled apparatus having functionality to operate both as a station and as an access point, and when selected to operate in an access point ("AP") mode, to communicate directly with the second device via the first pathway, comprising:

an AP module, including an Association Configuration Protocol ("ACP") configurator, to configure an ACP broadcast message that includes information indicating device capabilities of the DAS enabled apparatus device, wherein the ACP broadcast message includes an ACP type-length-value ("TLV") field to indicate an open ACP window, to transmit the ACP broadcast message in a broadcast beacon to the second device via the first pathway without utilizing the second pathway and the network access point, and when a response is received from the second device in responding to the ACP broadcast message, to establish a client-server pair between the DAS enabled apparatus and the second device to exchange data wirelessly and directly between the DAS enabled apparatus and the second device using the first pathway during a period of the open ACP window; and a STA module to switch from the AP mode to a station ("STA") mode for the DAS enabled apparatus device after exchanging data to have the DAS enabled apparatus communicate with the network access point for communication via the second pathway.

14. The DAS enabled apparatus of claim 13, wherein the TLV field is added to an Information Element ("IE") in the broadcast beacon.

15. The DAS enabled apparatus of claim 13, wherein when the ACP window is opened, security information is to be exchanged between the DAS enabled apparatus and the second device.

16. The DAS enabled apparatus of claim 13, wherein the second device to transmit an initialization message to the ACP configurator when in an active mode to respond to the open ACP window.

17. The DAS enabled apparatus of claim 13, wherein the AP module to utilize IEEE 802.11a, IEEE 802.11b or IEEE 802.11g communication protocol for the first pathway.

18. The DAS enabled apparatus of claim 13, wherein the AP module to utilize IEEE 802.11a, IEEE 802.11b or IEEE 802.11g communication protocol and the STA module to also utilize one of the IEEE 802.11a, IEEE 802.11b or IEEE 802.11g communication protocol.

19. The DAS enabled apparatus of claim 13, wherein the DAS enabled apparatus is to be configured as a master device and the second device is to be configured as a slave device.

20. The DAS enabled apparatus of claim 13, wherein the DAS enabled apparatus is a media source and the second device is a media render.

\* \* \* \* \*